Jan. 1, 1963     O. C. HOLBROOK ET AL     3,070,991
SYNTHETIC CORES

Original Filed Aug. 5, 1957     3 Sheets-Sheet 1

INVENTORS
ORRIN C. HOLBROOK
GEORGE G. BERNARD
BY
ATTORNEY

Jan. 1, 1963  O. C. HOLBROOK ET AL  3,070,991
SYNTHETIC CORES
Original Filed Aug. 5, 1957  3 Sheets-Sheet 2

INVENTORS
ORRIN C. HOLBROOK
GEORGE G. BERNARD
BY
*Edward H. Sang*
ATTORNEY

INVENTORS
ORRIN C. HOLBROOK
BY GEORGE G. BERNARD

ATTORNEY

United States Patent Office 3,070,991
Patented Jan. 1, 1963

3,070,991
SYNTHETIC CORES
Orrin C. Holbrook and George G. Bernard, Crystal Lake, Ill., assignors to The Pure Oil Company, Chicago, Ill., a corporation of Ohio
Continuation of application Ser. No. 676,188, Aug. 5, 1957. This application July 2, 1959, Ser. No. 824,744
13 Claims. (Cl. 73—38)

This application is a continuation of application Serial No. 676,188, filed August 5, 1957, now abandoned.

This invention is directed to synthetic testing-cores and to the method for their manufacture.

In the drilling of present bores in gas and oil formations it is common practice to core the formation and to perform various tests theron in order to determine the nature of the formation. Cores are frequently taken prior to secondary recovery by gas injection or water flooding in order to determine the porosity and permeability of the formation. In connection with water flooding operations it is important to know what the water sensitivity of the formation is since swelling of the formation results in plugging and resultant failure of the secondary recovery.

The water sensitivity of formations is determined by the clay content and the nature of the clay present. However, it is difficult to determine quantitatively the clay composition of natural core samples. Furthermore, the natural cores are expensive to obtain and therefore their supply is limited. Difficulty is also experienced in working with natural cores in that they frequently disintegrate or plug up completely in the presence of water. For these reasons it was found that natural cores were not entirely satisfactory for doing investigative work on the various aspects of water sensitivity.

In accordance with our invention, we have discovered that cores suitable for investigating water sensitivity of earth formations and for other investigative purposes can be synthesized by mixing together sand, clay and a synthetic resin molding-powder, and subjecting the mixture to high pressure in a mold or cylinder at a temperature sufficiently elevated to cause distortion or softening of the resin.

An object of our invention is to provide synthetic testing-cores which may be used instead of natural earth-formation cores for water sensitivity and other investigative work. A further object of the invention is to provide a method for preparing synthetic cores for investigative work.

Figure 1:
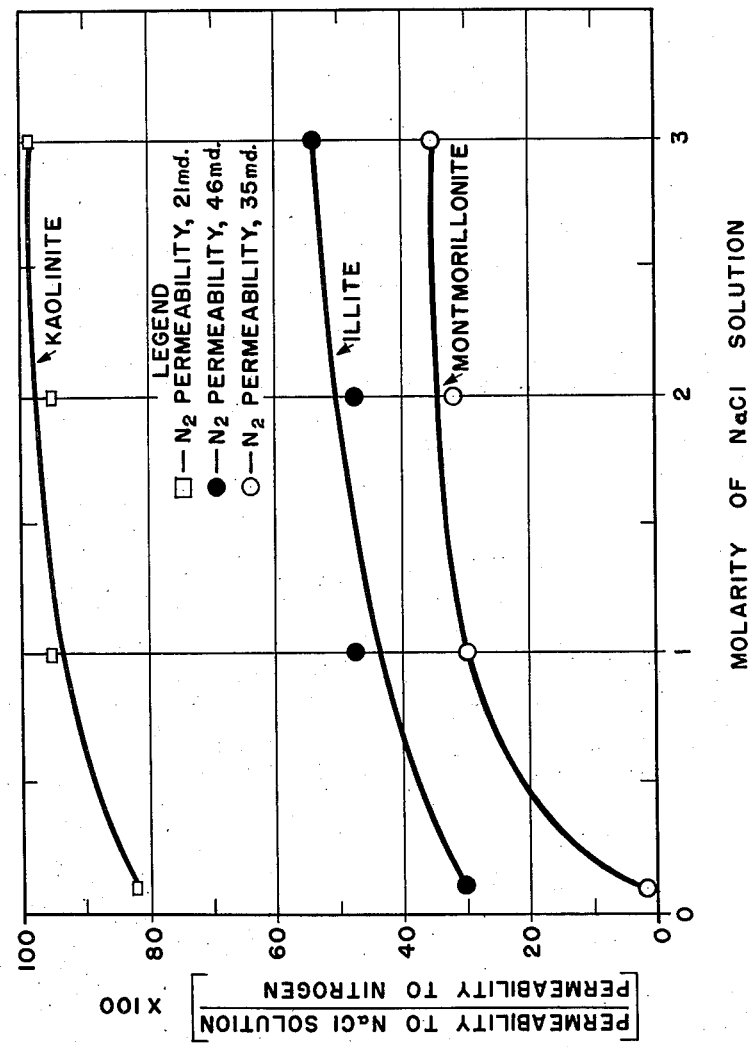
Figure 2:
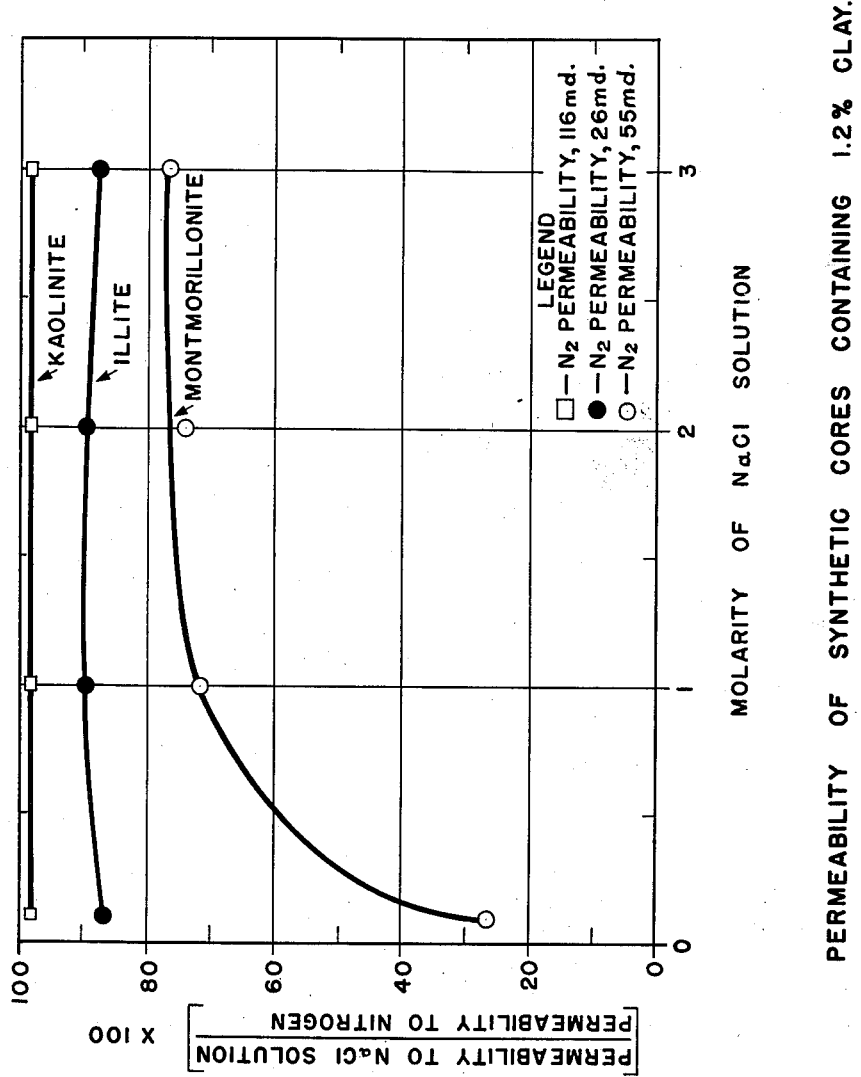

Other objects of the invention will manifest themselves from a consideration of the following description and accompanying drawings, of which FIGURE 1 is a graph showing the effect of different concentrations of salt solution on the permeability of synthetic cores containing different types of clays; and FIGURE 2 is a graph similar to FIGURE 1, showing the effect of salt solutions on synthetic cores containing a lesser amount of clay than the cores of FIGURE 1.

Figure 3:
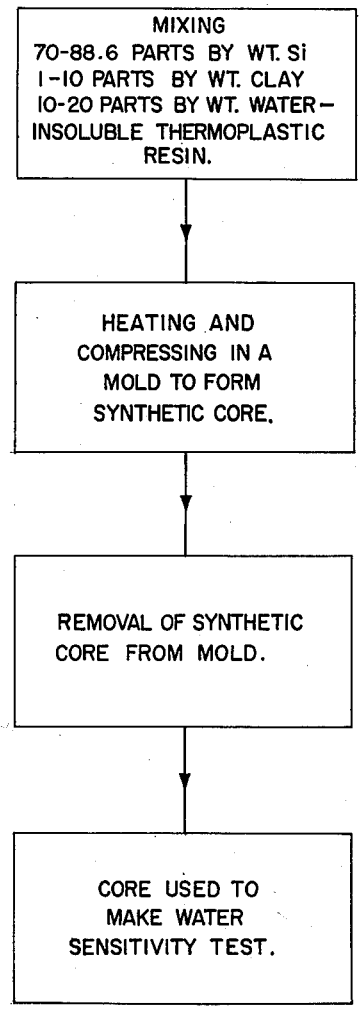

FIGURE 3 is a flow sheet showing the steps involved in preparing and using the synthetic cores in accordance with the invention.

In preparing synthetic cores in accordance with our invention, a mixture composed principally of sand, with sufficient thermoplastic resin in powder form to bind the core together, and varying amounts of clay, depending on the permeability desired, are thoroughly mixed and placed in a cylinder of desired size equipped with an hydraulic or other power-operated piston. If it is desired to produce a core the walls of which are sealed, a tube made of the same or different resin used as binding material in the core mixture may first be placed within a steel tube of sufficient thickness to withstand the pressures to which the molding mixture is subjected. The tube should fit snugly within the metal tube. The bottom of the metal tube is temporarily plugged with a snugly-fitting metal disc and the tube is placed on a platform to hold the sealing disc in place. The synthetic core mixture is poured into the resin tube and, when the tube is filled, the outside steel cylinder is heated by means of an electrical coil, or by any other suitable means, to a temperature sufficent to bring the mixture within the tube to the distortion or softening point of the resin. The mixture is then subjected to pressures of the order of 2,000 to 8,000 lb. per square inch by means of the hydraulic piston, and pressure is maintained on the mixture for a period sufficient to insure that the synthetic core mixture is bound into a solid core which will not disintegrate upon removal from the molding tube. This time may vary from about 10 to 30 minutes. We have found that satisfactory results are obtained if the pressure is maintained for a period of about 15 minutes.

On release of the pressure, the synthetic core is ejected from the tube by raising the tube from the supporting platform and forcing the core out by means of the hydraulic piston. The resulting core is then machined at both ends to make flat, smooth surfaces. The core will be surrounded by the synthetic resin tube in which it was molded so that the walls of the core will be sealed.

If it is desired to prepare cores the walls of which are not sealed, or if it is desired to prepare cores the walls of which can be sealed subsequently by painting or coating with a resinous sealing material, the comminuted core mixture may be poured directly into the steel molding tube and subjected to the required heat and pressure.

Although we prefer to use an acrylic resin as the binder, such as Lucite, other water-insoluble thermoplastic resins which are able to withstand impact, and have strength and resistance to deterioration under conditions of outdoor exposure, may be used in place thereof. Examples of other synthetic water-insoluble resins which may be used are aniline formaldehyde resins, cellulose acetate, cellulose acetate butyrate, cellulose acetate propionate, ethyl cellulose, melamine resins, phenol furfural resins, phenol formaldehyde resins, polyamides (nylon), polyethylene, styrene polymers and co-polymers, urea resins, polymerized vinyl acetate, vinyl acetal, vinyl alcohol, vinyl butyral, vinyl carbazole, vinyl chloride, vinyl chloride acetate, vinyl formal, and vinylidene chloride (Saran). The properties of these resins are given in "Materials and Methods" published by Reinhold Publishing Company, September 1948, pages 91 to 104, and in Lange's Handbook of Chemistry, 9th edition (1956), at pages 847, 849 and 950. The general formulas for Lucite, nylon and Saran are $[--CH_2 \cdot C(CH_3)(CO \cdot OCH_3)--]_n$ (Lucite)
$[--CO \cdot (CH_2)_4 \cdot CO \cdot NH \cdot (CH_2)_6 \cdot NH--]_n$ (nylon)
$[--CH_2 \cdot CCl_2 \cdot CH_2 \cdot CHCl--]_n$ (Saran)

The properties of these materials are as follows:

| | Lucite | Nylon | Saran |
|---|---|---|---|
| Fabrication: | | | |
| Bulk factor | 1.7-2.5 | 2.3 | 2 |
| Injection moldg. temp., °F | 325-480 | 510-600 | 300-400 |
| Injection moldg. pressure, p.s.i. times $10^{-3}$ | 10-30 | Low | 10-30 |
| Mold shrinkage, mils/in | 3-6 | 12-15 | 5-15 |
| Physical: | | | |
| Specific gravity | 1.18-1.20 | 1.14-1.16 | 1.65-1.72 |
| Specific volume, in.$^3$/lb | 18-20 | 24 | 16-17 |
| Coefficient thermal expansion, linear times $10^5$ | 7-9 | 10.3 | 19 |
| Specific heat, cal./g | 0.35 | 0.43 | 0.32 |
| Thermal conductivity times $10^4$ | 4-6 | 6 | 2.2 |
| Heat distortion temperature, °F | 135-200 | 165-170 | 150-180 |
| Heat resistance—continuous, °F | 120-140 | | 160-200 |
| Flammability, in./min | 0.5-1.0 | Self ext. | None |
| Water absorption, percent | 0.3-0.6 | 1.5 | <0.1 |
| Mechanical: | | | |
| Impact strength, Izod ft-lbs./in | 0.2-0.4 | 0.6-0.9 | 0.3-1.0 |
| Tensile strength, p.s.i., times $10^{-3}$ | 4-6 | 9-10.5 | 4-7 |
| Elongation at break, percent | 1-10 | 45-55 | 10-40 |
| Flexural strength, p.s.i. times $10^{-3}$ | 10-20 | 11-13 | 15-17 |
| Compressive strength, p.s.i. times $10^{-3}$ | 9-15 | 14-16 | 4.5-5.5 |
| Electrical: | | | |
| Dielec. strength, short, v./mil | 500 | 350-400 | 350-400 |
| Vol. resistivity, ohms-cm | $10^{15}$-$10^{19}$ | $10^{15}$-$10^{13}$ | $10^{14}$-$10^{16}$ |
| Dielec. constant, 60 cycles | 3.4-3.6 | 4-5 | 3-5 |
| Dielec. constant, 1,000 cycles | 3.3-3.5 | 4.5-5 | 3-5 |
| Dielec. constant, $10^6$ cycles | 2.8-3.3 | 3.4-4.0 | 3-5 |
| Power factor, 60 cycles | 50-60 | 14-50 | 30-80 |
| Power factor, 1,000 cycles | 40-70 | 20-50 | 30-150 |
| Power factor, $10^6$ cycles | 28-33 | 40-70 | 30-50 |

The temperature to be used in connection with each particular resin is the lower temperature at which distortion begins when subjected to pressure. These temperatures are given on page 103 of the aforesaid publication. For example, the acrylic resins begin to distort at 120° F. Therefore, when using Lucite, an acrylic resin, as the binder for the core, the mixture should be heated to a temperature of about 120° F. and subjected to the desired pressure at this temperature. When using nylon, a polyamide resin, as the binder, the temperature for molding should be about 170° F. When using Saran, a vinylidene chloride, the temperature should be about 150° F. Care should be exercised in not heating the core mixture to the point where the resin flows since fusion of the resin particles with each other will take place and render the core impervious to the passage of gas or liquid.

In preparing the cores, various size sand grains and various types of clays can be employed. The size of the sand grain will influence the permeability of the core in a surprising manner. With sand grains within the size of 20-150 mesh, the permeability of the core increases as the sand particles decrease in size. As the sand grains decrease in size beyond 150 mesh, the permeability of the core decreases. Sand grains larger than 20 mesh are too large for practical purposes.

The pressure to which the core mixture is subjected during the core molding operation will also determine the permeability of the molded core. As the pressure is increased, the permeability of the core is decreased.

The type and amount of clay in the core also influence the permeability of the core. The greater the amount of clay in the core, the less the permeability. Moreover, a clay such as kaolinite imparts greater permeability to the core than either illite or montmorillonite, and appears to be less sensitive to water.

The amount of synthetic resin in the core also affects the permeability, larger amounts rendering the core less permeable. As an example illustrating the invention, a mixture of 75% sand (50-70 mesh), 15% of Lucite molding powder, and 10% of montmorillonite was stirred together until a homogeneous mixture was obtained. A Lucite tube 1⅜" in length with an outside diameter of 1½" and an inside diameter of 1⅛" was placed inside of a steel cylinder having an inside diameter of 1½" and a wall thickness of ¼". A steel disc was placed in the bottom of the steel cylinder to act as a plug. The plug at the bottom was mounted on a steel platform. A removable, electric heating coil was placed around the metal cylinder and the temperature was controlled so that the molding powder obtained a temperature of 120° F., at which point the heating coil was removed. A pressure of 4,000 p.s.i. was exerted on the molding composition by means of an hydraulic piston which fitted into the metal cylinder, and the pressure was maintained for 15 minutes. The cylinder and the contents were allowed to cool to approximately room temperature and the core was then ejected. The two faces of the core were ground flat on a machine lathe. The resulting core was determined to have a porosity of 14.4% and an air permeability of 33.9 millidarcies.

A number of other synthetic cores were prepared in the manner just described. The composition of the cores, the pressure used in the formation thereof, and the porosity and permeability of the resultant cores are given in the following Table II.

TABLE II

*Properties of Synthetic Cores*

| Core No. | Composition, percent weight | | | | | Sand mesh | Formation pressure, p.s.i. | Porosity, percent | Air permeability, millidarcies |
|---|---|---|---|---|---|---|---|---|---|
| | Montmorillonite | Illite | Kaolinite | Lucite | Sand | | | | |
| 1 | 5.5 | 0.0 | 0.0 | 16.7 | 77.8 | 50-70 | 4,000 | 11.0 | 35.4 |
| 2 | 0.0 | 5.5 | 0.0 | 16.7 | 77.8 | 50-70 | 4,000 | 11.4 | 46.0 |
| 3 | 0.0 | 0.0 | 5.5 | 16.7 | 77.8 | 50-70 | 4,000 | 13.3 | 20.5 |
| 4 | 1.2 | 0.0 | 0.0 | 17.4 | 81.4 | 50-70 | 4,000 | 9.4 | 54.5 |
| 5 | 0.0 | 1.2 | 0.0 | 17.4 | 81.4 | 50-70 | 4,000 | 8.5 | 26.4 |
| 6 | 0.0 | 0.0 | 1.2 | 17.4 | 81.4 | 50-70 | 4,000 | 13.0 | 116.5 |
| 7 | 1.0 | 4.0 | 4.0 | 16.0 | 74.0 | 50-70 | 4,000 | | 13.7 |
| 8 | 0.1 | 0.0 | 0.0 | 17.6 | 82.3 | 50-70 | 4,000 | 9.0 | 48.8 |
| 9 | 10.0 | 0.0 | 0.0 | 15.9 | 74.1 | 50-70 | 4,000 | 14.4 | 33.9 |
| 10 | 0.0 | 10.0 | 0.0 | 15.9 | 74.1 | 50-70 | 4,000 | 12.7 | 23.9 |
| 11 | 0.0 | 0.0 | 10.0 | 15.9 | 74.1 | 50-70 | 4,000 | | 3.0 |
| 12 | 5.5 | 0.0 | 0.0 | 16.7 | 77.8 | 100-150 | 4,000 | 16.6 | 157.0 |
| 13 | 5.5 | 0.0 | 0.0 | 16.7 | 77.8 | 20-30 | 4,000 | | 10.2 |
| 14 | 5.5 | 0.0 | 0.0 | 16.7 | 77.8 | 50-70 | 3,000 | 12.7 | 77.4 |
| 15 | 5.5 | 0.0 | 0.0 | 16.7 | 77.8 | 50-70 | 2,000 | 16.8 | 232.0 |
| 16 | 5.5 | 0.0 | 0.0 | 16.7 | 77.8 | 250 | 4,000 | | 7.3 |
| 17 | 0.0 | 4.3 | 4.3 | 16.1 | 75.3 | 100-150 | 4,000 | 16.4 | 89.7 |
| 18 | 0.0 | 4.3 | 4.3 | 16.1 | 75.3 | 100-150 | 8,000 | 15.2 | 29.1 |
| 19 | 2.5 | 0.0 | 0.0 | 12.2 | 85.2 | 50-70 | 4,000 | 20.7 | 1,200.0 |

The water sensitivity of cores made in the manner just described, containing 1.2 and 5.6% of clay, was determined for sodium chloride solutions of different normalities. In these tests, 15% of Lucite was used in making the cores and the balance was sand having a mesh of 50–70. The cores were all made at 4,000 p.s.i. pressure. The water sensitivity of the various cores is shown in FIGURES 1 and 2. The water sensitivity was determined by measuring permeability to nitrogen and then to the sodium chloride solution. The ratio multiplied by 100 gives the measure of the permeability of the core to the particular sodium chloride solution. By reference to FIGURE 1 it will be seen that not only are montmorillonite and illite clays more sensitive to water and sodium chloride solutions than is kaolinite, but that the presence of salt in the solution has a greater effect on the montmorillonite than on kaolinite or illite, that is, montmorillonite is much more sensitive to pure water than it is to sodium chloride solution.

FIGURE 2 demonstrates the further fact that the amount of clay in the core greatly affects the water sensitivity of the core. This is particularly true with respect to illite and montmorillonite.

Although the amount of clay and resin in the core mixture may vary, the amount of clay should be commensurate with that which is present in the formations which are to be treated. The amount of resin should be only sufficient to give the core the necessary strength and cohesion so that it will not disintegrate during testing. An amount from about 10–20% is ordinarily satisfactory. The coarseness of the sand utilized in preparing the core will depend upon the resulting permeability desired in the finished core.

It will be seen that we have succeeded in preparing synthetic cores which simulate natural earth-formation cores, and which furnish an easy and cheap method for making water sensitivity and other studies necessary for the successful production of oil from underground formations.

We claim as our invention:

1. The method of producing synthetic cores for use in making water sensitivity determinations in connection with treatment of subterranean earth formations consisting in mixing substantially only about 70–88.6 parts by weight of comminuted silica having a mesh smaller than 20, an amount of about 1 to 10 parts by weight of clay, from the group consisting of illite, kaolinite and montmorillonite, commensurate with the amount and of the type of clay in the earth formation to be treated, and about 10 to 20 parts by weight of water-insoluble synthetic organic thermoplastic resin able to withstand impact and having strength and resistance to deterioration under conditions of outdoor exposure, heating the mixture in a cylindrical mold to a temperature sufficient to soften the resin without causing fusion thereof, subjecting the heated mixture while in said mold to pressures of 2000 to 8000 pounds per square inch whereby to bind the mixture into a solid mass permeable to aqueous liquid which will not disintegrate upon removal from the mold and removing the finished core from the mold, the size of the silica particles, the type and amount of clay in the mixture and the pressure to which the mixture is subjected being selected to produce cores of the desired permeability.

2. Method in accordance with claim 1 in which the resin is a methyl methacrylate resin and the mixture is heated to about 120° F.

3. Method in accordance with claim 1 in which the mixture is placed inside a tube of synthetic thermoplastic resin which in turn is inserted in the mold and the heat and pressure is applied to the mixture while in said tube to produce a core with impermeable side walls formed by said tube and permeable end walls formed by machining the ends of the core after removal from said mold.

4. Method in accordance with claim 1 in which the side walls of said core are sealed with a resinous sealing material and the ends of the core are machined to smooth flat surfaces.

5. A synthetic core suitable for making water sensitivity tests composed of a molded mixture of about 70 to 88.6 parts by weight of sand having a mesh not larger than 20, about 1 to 10 parts by weight of clay, and 10 to 20 parts by weight of water-insoluble synthetic organic, thermoplastic resin, bonded together into a hard, firm compressed mass resistant to disintegration when subjected to said tests and being permeable to water.

6. A synthetic core in accordance with claim 5 in which the clay is montmorillonite.

7. A synthetic core in accordance with claim 6 in which the resin is a methyl methacrylate resin.

8. A synthetic core in accordance with claim 7 in which the side walls are surrounded by an adherent coating of resinous material and the ends of the core are machined to smooth flat surfaces.

9. A synthetic core in accordance with claim 6 which is cylindrical in shape.

10. In the method of testing the sensitivity to water of subterranean earth formations the steps of intimately mixing about 70–88.6 parts by weight of comminuted silica having a mesh smaller than 20, an amount of clay, between about 1 to 10 parts by weight, commensurate with and of the type which occurs in the formation to be tested, and about 10 to 20 parts by weight of water-insoluble, synthetic organic thermoplastic resin of desired strength and resistance to deterioration when subjected to outdoor exposure, heating the mixture in a cylindrical mold to a temperature sufficient to soften the resin without causing fusion thereof, and subjecting the heated mixture while in said mold to pressures of the order of 2,000 to 8,000 pounds per square inch, thereby combining the mixture into a solid mass having a permeability corresponding to that of the formation to be tested, and which will not disintegrate upon removal from the mold, removing the cylindrical mass from the mold and thereafter forcing through the cylindrical mass under pressure nitrogen gas followed by water to be tested, and measuring the permeability of the mass to the gas and water.

11. Method in accordance with claim 10 in which the clay is montmorillonite.

12. Method in accordance with claim 11 in which the resin is a methyl methacrylate resin.

13. Method in accordance with claim 10 in which the side walls of the tubular mass are surrounded by an adherent coating of resinous material and the ends of the mass are machined to smooth flat surfaces.

References Cited in the file of this patent

UNITED STATES PATENTS

| | | |
|---|---|---|
| 966,078 | Bowman | Aug. 2, 1910 |
| 2,056,415 | Young | Oct. 6, 1936 |
| 2,282,328 | Herrick et al. | May 12, 1942 |
| 2,302,564 | Megow et al. | Nov. 17, 1942 |
| 2,398,047 | Schmidt | Apr. 9, 1946 |
| 2,705,822 | Vennerholm | Apr. 12, 1955 |
| 2,765,507 | Wolf et al. | Oct. 9, 1956 |
| 2,817,128 | Wickett | Dec. 24, 1957 |